(12) United States Patent
Bratt et al.

(10) Patent No.: US 8,405,668 B2
(45) Date of Patent: Mar. 26, 2013

(54) STREAMING TRANSLATION IN DISPLAY PIPE

(75) Inventors: Joseph P. Bratt, San Jose, CA (US); Peter F. Holland, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 12/950,293

(22) Filed: Nov. 19, 2010

(65) Prior Publication Data

US 2012/0131306 A1  May 24, 2012

(51) Int. Cl.
*G06F 12/00* (2006.01)
*G06F 12/02* (2006.01)
*G06F 12/10* (2006.01)

(52) U.S. Cl. ......... 345/568; 345/564; 345/565; 345/566

(58) Field of Classification Search .......... 345/564–566, 345/568
See application file for complete search history.

(56) References Cited

U.S. PATENT DOCUMENTS

| | | | |
|---|---|---|---|
| 5,319,760 A | 6/1994 | Mason et al. | |
| 6,628,294 B1 * | 9/2003 | Sadowsky et al. | 345/568 |
| 6,812,929 B2 | 11/2004 | Lavelle et al. | |
| 8,024,547 B2 * | 9/2011 | Lee et al. | 711/213 |
| 2003/0142103 A1 | 7/2003 | Hussain et al. | |
| 2003/0169262 A1 | 9/2003 | Lavelle et al. | |
| 2006/0004984 A1 | 1/2006 | Morris et al. | |
| 2006/0179236 A1 | 8/2006 | Shafi | |
| 2008/0276066 A1 | 11/2008 | Lee et al. | |
| 2008/0276067 A1 | 11/2008 | Chen et al. | |
| 2010/0205344 A1 * | 8/2010 | Caprioli et al. | 711/3 |

OTHER PUBLICATIONS

International Search Report and Written Opinion from PCT/US2011/059384 dated Mar. 15, 2012.
EPO, Notification of European Publication Number, issued May 13, 2012, application No. 11188384.9, publication No. 2466474, 2 pages.
EPO Extended Search Report, issued May 23, 2012, EP Application No. 11188384.9, 7 pages.

* cited by examiner

*Primary Examiner* — Hau Nguyen
(74) *Attorney, Agent, or Firm* — Lawrence J. Merkel; Meyertons, Hood, Kivlin, Kowert & Goetzel, P.C.

(57) ABSTRACT

In an embodiment, a display pipe includes one or more translation units corresponding to images that the display pipe is reading for display. Each translation unit may be configured to prefetch translations ahead of the image data fetches, which may prevent translation misses in the display pipe (at least in most cases). The translation units may maintain translations in first-in, first-out (FIFO) fashion, and the display pipe fetch hardware may inform the translation unit when a given translation or translation is no longer needed. The translation unit may invalidate the identified translations and prefetch additional translation for virtual pages that are contiguous with the most recently prefetched virtual page.

14 Claims, 9 Drawing Sheets

STREAMING TRANSLATION IN DISPLAY PIPE

BACKGROUND

1. Field of the Invention

This invention is related to the field of virtual memory systems.

2. Description of the Related Art

Virtual memory systems are implemented in computing systems for a variety of reasons. For example, virtual memory can be used to make a larger virtual memory space available to a software process while implementing a smaller physical memory. Non-volatile storage such as a disk drive may store data from the virtual memory space that is not currently in use. Virtual memory can be used to isolate different software processes executing on the same system, so that one process cannot access data that belongs to another process. Virtual memory can also be used to permit controlling software (such as an operating system, a virtual machine monitor (VMM) such as a hypervisor, or other privileged software) to relocate data in the physical memory while appearing to the process to be contiguous memory addressed in the virtual memory space. Thus, the data can be allocated to available memory anywhere in the physical memory space. Since the physical memory is shared among the processes, the ability to relocate data in the physical memory eases the burden on the controlling software.

Typically, the controlling software prepares translations from virtual addresses to the physical addresses of memory locations allocated for the virtual addresses. The translation information is stored in one or more page tables in memory, and translation hardware in the system caches the translation information to translate virtual addresses to physical addresses. The translations are performed on a page granularity. That is, a block of virtual addresses aligned to a page boundary in the virtual memory system are all translated by the same translation to a physical page in memory. The page size can vary (e.g. 4 kilobytes, 8 kilobytes, or even larger into megabytes in some cases). Some systems support a variable page size, either programmably selectable such that all pages are the selected size at a given point in time or variable on a page-by-page basis such that different page sizes are supported concurrently. The translation information that specifies a physical page address for a given virtual page is referred to as the translation for that virtual page. The translation includes a physical page number identifying the physical page, and may include various attribute bits such as a valid bit, cache attributes, etc. The virtual page is a page-aligned, page-sized block in the virtual address space, and similarly the physical page is a page-aligned, page-sized block in the physical address space.

The caching of translations speeds the process of accessing memory using a virtual address (translated to the physical address through the cached translations). However, the caches are finite and thus there are occasionally misses that require the translation to be fetched from memory into the translation hardware. Hardware may read the missing translation from memory, or software may load the translation into the hardware, in various implementations. In either case, the latency of the memory access is increased when a translation miss occurs.

SUMMARY

In an embodiment, a display pipe includes one or more translation units corresponding to images that the display pipe is reading for display. Each translation unit may be configured to prefetch translations ahead of the image data fetches, which may prevent translation misses in the display pipe (at least in most cases). The translation units may maintain translations in first-in, first-out (FIFO) fashion, and the display pipe fetch hardware may inform the translation unit when a given translation or translations is no longer needed. The translation unit may invalidate the identified translations and prefetch additional translations for virtual pages that are contiguous with the most recently prefetched virtual page.

In an embodiment, the incorporation of the prefetching translation units described above may permit a more complex translation unit to be dedicated to an image processor that shares the same port to memory that the display pipes use. Because competition from the display pipe is eliminated from the more complex translation unit, the more random-access memory requests from the image processor may be more likely to hit in the more complex translation unit, which may reduce the miss rate for the image processor as well.

BRIEF DESCRIPTION OF THE DRAWINGS

The following detailed description makes reference to the accompanying drawings, which are now briefly described.

Figure 1:
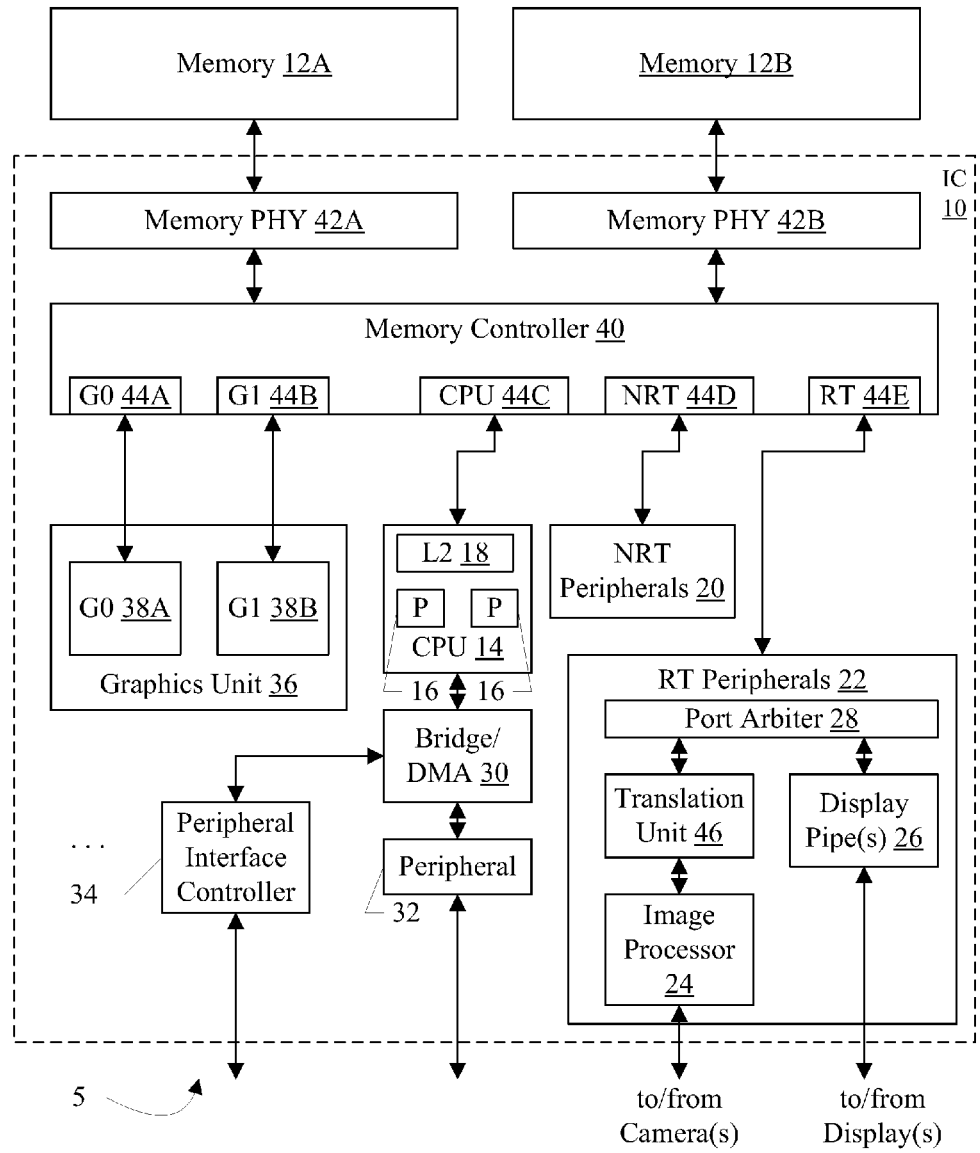
FIG. 1 is a block diagram of one embodiment of an integrated circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits that implement the operation. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a system 5 is shown. In the embodiment of FIG. 1, the system 5 includes an integrated circuit (IC) 10 coupled to external memories 12A-12B. In the illustrated embodiment, the integrated circuit 10 includes a central processor unit (CPU) block 14 which includes one or more processors 16 and a level 2 (L2) cache 18. Other embodiments may not include L2 cache 18 and/or may include additional levels of cache. Additionally, embodiments that include more than two processors 16 and that include only one processor 16 are contemplated. The integrated circuit 10 further includes a set of one or more non-real time (NRT) peripherals 20 and a set of one or more real time (RT) peripherals 22. In the illustrated embodiment, the RT peripherals include an image processor 24, one or more display pipes 26, a translation unit 46, and a port arbiter 28. Other embodiments may include more or fewer image processors 24, more or fewer display pipes 26, and/or any additional real time peripherals as desired. The image processor 24 may be coupled to receive image data from one or more cameras in the system 5. Similarly, the display pipes 26 may be coupled to one or more display controllers (not shown) which control one or more displays in the system. The image processor 24 may be coupled to the translation unit 46, which may be further coupled to the port arbiter 28. The port arbiter 28 may be coupled to the display pipes 26 as well. In the illustrated embodiment, the CPU block 14 is coupled to a bridge/direct memory access (DMA) controller 30, which may be coupled to one or more peripheral devices 32 and/or one or more peripheral interface controllers 34. The number of peripheral devices 32 and peripheral interface controllers 34 may vary from zero to any desired number in various embodiments. The system 5 illustrated in FIG. 1 further includes a graphics unit 36 comprising one or more graphics controllers such as G0 38A and G1 38B. The number of graphics controllers per graphics unit and the number of graphics units may vary in other embodiments. As illustrated in FIG. 1, the system 5 includes a memory controller 40 coupled to one or more memory physical interface circuits (PHYs) 42A-42B. The memory PHYs 42A-42B are configured to communicate on pins of the integrated circuit 10 to the memories 12A-12B. The memory controller 40 also includes a set of ports 44A-44E. The ports 44A-44B are coupled to the graphics controllers 38A-38B, respectively. The CPU block 14 is coupled to the port 44C. The NRT peripherals 20 and the RT peripherals 22 are coupled to the ports 44D-44E, respectively. The number of ports included in a memory controller 40 may be varied in other embodiments, as may the number of memory controllers. The number of memory PHYs 42A-42B and corresponding memories 12A-12B may be one or more than two in other embodiments.

In one embodiment, each port 44A-44E may be associated with a particular type of traffic. For example, in one embodiment, the traffic types may include RT traffic, NRT traffic, and graphics traffic. Other embodiments may include other traffic types in addition to, instead of, or in addition to a subset of the above traffic types. Each type of traffic may be characterized differently (e.g. in terms of requirements and behavior), and the memory controller may handle the traffic types differently to provide higher performance based on the characteristics. For example, RT traffic requires servicing of each memory operation within a specific amount of time. If the latency of the operation exceeds the specific amount of time, erroneous operation may occur in the RT peripheral. For example, image data may be lost in the image processor 24 or the displayed image on the displays to which the display pipes 26 are coupled may visually distort. RT traffic may be characterized as isochronous, for example. On the other hand, graphics traffic may be relatively high bandwidth, but is not latency-sensitive. NRT traffic, such as from the processors 16, is more latency-sensitive for performance reasons but survives higher latency. That is, NRT traffic may generally be serviced at any latency without causing erroneous operation in the devices generating the NRT traffic. Similarly, the less latency-sensitive but higher bandwidth graphics traffic may be generally serviced at any latency. Other NRT traffic may include audio traffic, which is relatively low bandwidth and generally may be serviced with reasonable latency. Most peripheral traffic may also be NRT (e.g. traffic to storage devices such as magnetic, optical, or solid state storage). By providing ports 44A-44E associated with different traffic types, the memory controller 40 may be exposed to the different traffic types in parallel.

As mentioned above, the RT peripherals 22 may include the image processor 24 and the display pipes 26. The display pipes 26 may include circuitry to fetch one or more image frames and to blend the frames to create a display image. The display pipes 26 may further include one or more video pipelines, and video frames may be blended with (relatively) static image frames to create frames for display at the video frame rate. The result of the display pipes 26 may be a stream of pixels to be displayed on the display screen. The pixel values may be transmitted to a display controller for display on the display screen. The image processor 24 may receive camera data and process the data to an image to be stored in memory.

Both the display pipes 26 and the image processor 24 may operate in virtual address space, and thus may use translations to generate physical addresses for the memory operations to read or write memory. The image processor 24 may have a somewhat random-access memory pattern, and may thus rely on the translation unit 46 for translation. The translation unit 46 may employ a translation lookaside buffer (TLB) that caches each translation for a period of time based on how frequently the translation is used with respect to other cached translations. For example, the TLB may employ a set associative or fully associative construction, and a least recently used (LRU)-type algorithm may be used to rank recency of use of the translations among the translations in a set (or across the TLB in fully associative configurations). LRU-type algorithms may include, for example, true LRU, pseudo-LRU, most recently used (MRU), etc. Additionally, a fairly large TLB may be implemented to reduce the effects of capacity misses in the TLB.

The access patterns of the display pipes 26, on the other hand, may be fairly regular. For example, image data for each source image may be stored in consecutive memory locations in the virtual address space. Thus, the display pipes may begin processing source image data from a virtual page, and subsequent virtual pages may be consecutive to the virtual page. That is, the virtual page numbers may be in numerical order, increasing or decreasing by one from page to page as the image data is fetched. Similarly, the translations may be consecutive to one another in a given page table in memory (e.g.

consecutive entries in the page table may translate virtual page numbers that are numerically one greater than or less than each other). While more than one page table may be used in some embodiments, and thus the last entry of the page table may not be consecutive to the first entry of the next page table, most translations may be consecutive in the page tables. Viewed in another way, the virtual pages storing the image data may be adjacent to each other in the virtual address space. That is, there may be no intervening pages between the adjacent virtual pages in the virtual address space.

The display pipes 26 may implement translation units that prefetch translations in advance of the display pipes' reads of image data. The prefetch may be initiated when the processing of a source image is to start, and the translation unit may prefetch enough consecutive translations to fill a translation memory in the translation unit. The fetch circuitry in the display pipes may inform the translation unit as the processing of data in virtual pages is completed, and the translation unit may invalidate the corresponding translation and prefetch additional translations. Accordingly, once the initial prefetching is complete, the translation for each virtual page may frequently be available in the translation unit as the display pipes 26 begin fetching from that virtual page. Additionally, competition for the translation unit 46 from the display pipes 26 may be eliminated in favor of the prefetching translation units. Since the translation units in the display pipes fetch translations for a set of contiguous virtual pages, they may be referred to as "streaming translation units."

In general, the display pipes 26 may include one or more user interface units that are configured to fetch relatively static frames. That is, the source image in a static frame is not part of a video sequence. While the static frame may be changed, it is not changing according to a video frame rate corresponding to a video sequence. The display pipes 26 may further include one or more video pipelines configured to fetch video frames. These various pipelines (e.g. the user interface units and video pipelines) may be generally referred to as "image processing pipelines."

Returning to the memory controller 40, generally a port may be a communication point on the memory controller 40 to communicate with one or more sources. In some cases, the port may be dedicated to a source (e.g. the ports 44A-44B may be dedicated to the graphics controllers 38A-38B, respectively). In other cases, the port may be shared among multiple sources (e.g. the processors 16 may share the CPU port 44C, the NRT peripherals 20 may share the NRT port 44D, and the RT peripherals 22 such as the display pipes 26 and the image processor 24 may share the RT port 44E. A port may be coupled to a single interface to communicate with the one or more sources. Thus, when sources share an interface, there may be an arbiter on the sources' side of the interface to select between the sources. For example, the L2 cache 18 may serve as an arbiter for the CPU port 44C to the memory controller 40. The port arbiter 28 may serve as an arbiter for the RT port 44E, and a similar port arbiter (not shown) may be an arbiter for the NRT port 44D. The single source on a port or the combination of sources on a port may be referred to as an agent. Each port 44A-44E is coupled to an interface to communicate with its respective agent. The interface may be any type of communication medium (e.g. a bus, a point-to-point interconnect, etc.) and may implement any protocol. In some embodiments, the ports 44A-44E may all implement the same interface and protocol. In other embodiments, different ports may implement different interfaces and/or protocols. In still other embodiments, the memory controller 40 may be single ported.

In an embodiment, each source may assign a quality of service (QoS) parameter to each memory operation transmitted by that source. The QoS parameter may identify a requested level of service for the memory operation. Memory operations with QoS parameter values requesting higher levels of service may be given preference over memory operations requesting lower levels of service. Each memory operation may include a flow ID (FID). The FID may identify a memory operation as being part of a flow of memory operations. A flow of memory operations may generally be related, whereas memory operations from different flows, even if from the same source, may not be related. A portion of the FID (e.g. a source field) may identify the source, and the remainder of the FID may identify the flow (e.g. a flow field). Thus, an FID may be similar to a transaction ID, and some sources may simply transmit a transaction ID as an FID. In such a case, the source field of the transaction ID may be the source field of the FID and the sequence number (that identifies the transaction among transactions from the same source) of the transaction ID may be the flow field of the FID. In some embodiments, different traffic types may have different definitions of QoS parameters. That is, the different traffic types may have different sets of QoS parameters.

The memory controller 40 may be configured to process the QoS parameters received on each port 44A-44E and may use the relative QoS parameter values to schedule memory operations received on the ports with respect to other memory operations from that port and with respect to other memory operations received on other ports. More specifically, the memory controller 40 may be configured to compare QoS parameters that are drawn from different sets of QoS parameters (e.g. RT QoS parameters and NRT QoS parameters) and may be configured to make scheduling decisions based on the QoS parameters.

In some embodiments, the memory controller 40 may be configured to upgrade QoS levels for pending memory operations. Various upgrade mechanism may be supported. For example, the memory controller 40 may be configured to upgrade the QoS level for pending memory operations of a flow responsive to receiving another memory operation from the same flow that has a QoS parameter specifying a higher QoS level. This form of QoS upgrade may be referred to as in-band upgrade, since the QoS parameters transmitted using the normal memory operation transmission method also serve as an implicit upgrade request for memory operations in the same flow. The memory controller 40 may be configured to push pending memory operations from the same port or source, but not the same flow, as a newly received memory operation specifying a higher QoS level. As another example, the memory controller 40 may be configured to couple to a sideband interface from one or more agents, and may upgrade QoS levels responsive to receiving an upgrade request on the sideband interface. In another example, the memory controller 40 may be configured to track the relative age of the pending memory operations. The memory controller 40 may be configured to upgrade the QoS level of aged memory operations at certain ages. The ages at which upgrade occurs may depend on the current QoS parameter of the aged memory operation.

The memory controller 40 may be configured to determine the memory channel addressed by each memory operation received on the ports, and may be configured to transmit the memory operations to the memory 12A-12B on the corresponding channel. The number of channels and the mapping of addresses to channels may vary in various embodiments and may be programmable in the memory controller. The memory controller may use the QoS parameters of the memory operations mapped to the same channel to determine an order of memory operations transmitted into the channel.

The processors 16 may implement any instruction set architecture, and may be configured to execute instructions defined in that instruction set architecture. The processors 16 may employ any microarchitecture, including scalar, superscalar, pipelined, superpipelined, out of order, in order, speculative, non-speculative, etc., or combinations thereof. The processors 16 may include circuitry, and optionally may implement microcoding techniques. The processors 16 may include one or more level 1 caches, and thus the cache 18 is an L2 cache. Other embodiments may include multiple levels of caches in the processors 16, and the cache 18 may be the next level down in the hierarchy. The cache 18 may employ any size and any configuration (set associative, direct mapped, etc.).

The graphics controllers 38A-38B may be any graphics processing circuitry. Generally, the graphics controllers 38A-38B may be configured to render objects to be displayed into a frame buffer. The graphics controllers 38A-38B may include graphics processors that may execute graphics software to perform a part or all of the graphics operation, and/or hardware acceleration of certain graphics operations. The amount of hardware acceleration and software implementation may vary from embodiment to embodiment.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as the peripheral 32 and/or peripherals coupled to a peripheral interface controlled by the peripheral interface controller 34 may also be non-real time peripherals, but may not require independent access to memory. Various embodiments of the NRT peripherals 20 may include video encoders and decoders, scaler/rotator circuitry, image compression/decompression circuitry, etc.

The bridge/DMA controller 30 may comprise circuitry to bridge the peripheral(s) 32 and the peripheral interface controller(s) 34 to the memory space. In the illustrated embodiment, the bridge/DMA controller 30 may bridge the memory operations from the peripherals/peripheral interface controllers through the CPU block 14 to the memory controller 40. The CPU block 14 may also maintain coherence between the bridged memory operations and memory operations from the processors 16/L2 Cache 18. The L2 cache 18 may also arbitrate the bridged memory operations with memory operations from the processors 16 to be transmitted on the CPU interface to the CPU port 44C. The bridge/DMA controller 30 may also provide DMA operation on behalf of the peripherals 32 and the peripheral interface controllers 34 to transfer blocks of data to and from memory. More particularly, the DMA controller may be configured to perform transfers to and from the memory 12A-12B through the memory controller 40 on behalf of the peripherals 32 and the peripheral interface controllers 34. The DMA controller may be programmable by the processors 16 to perform the DMA operations. For example, the DMA controller may be programmable via descriptors. The descriptors may be data structures stored in the memory 12A-12B that describe DMA transfers (e.g. source and destination addresses, size, etc.). Alternatively, the DMA controller may be programmable via registers in the DMA controller (not shown).

The peripherals 32 may include any desired input/output devices or other hardware devices that are included on the integrated circuit 10. For example, the peripherals 32 may include networking peripherals such as one or more networking media access controllers (MAC) such as an Ethernet MAC or a wireless fidelity (WiFi) controller. An audio unit including various audio processing devices may be included in the peripherals 32. One or more digital signal processors may be included in the peripherals 32. The peripherals 32 may include any other desired functional such as timers, an on-chip secrets memory, an encryption engine, etc., or any combination thereof.

The peripheral interface controllers 34 may include any controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc.

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 10 in a chip-on-chip configuration, a package-on-package configuration, or a multi-chip module configuration.

The memory PHYs 42A-42B may handle the low-level physical interface to the memory 12A-12B. For example, the memory PHYs 42A-42B may be responsible for the timing of the signals, for proper clocking to synchronous DRAM memory, etc. In one embodiment, the memory PHYs 42A-42B may be configured to lock to a clock supplied within the integrated circuit 10 and may be configured to generate a clock used by the memory 12.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Figure 2:
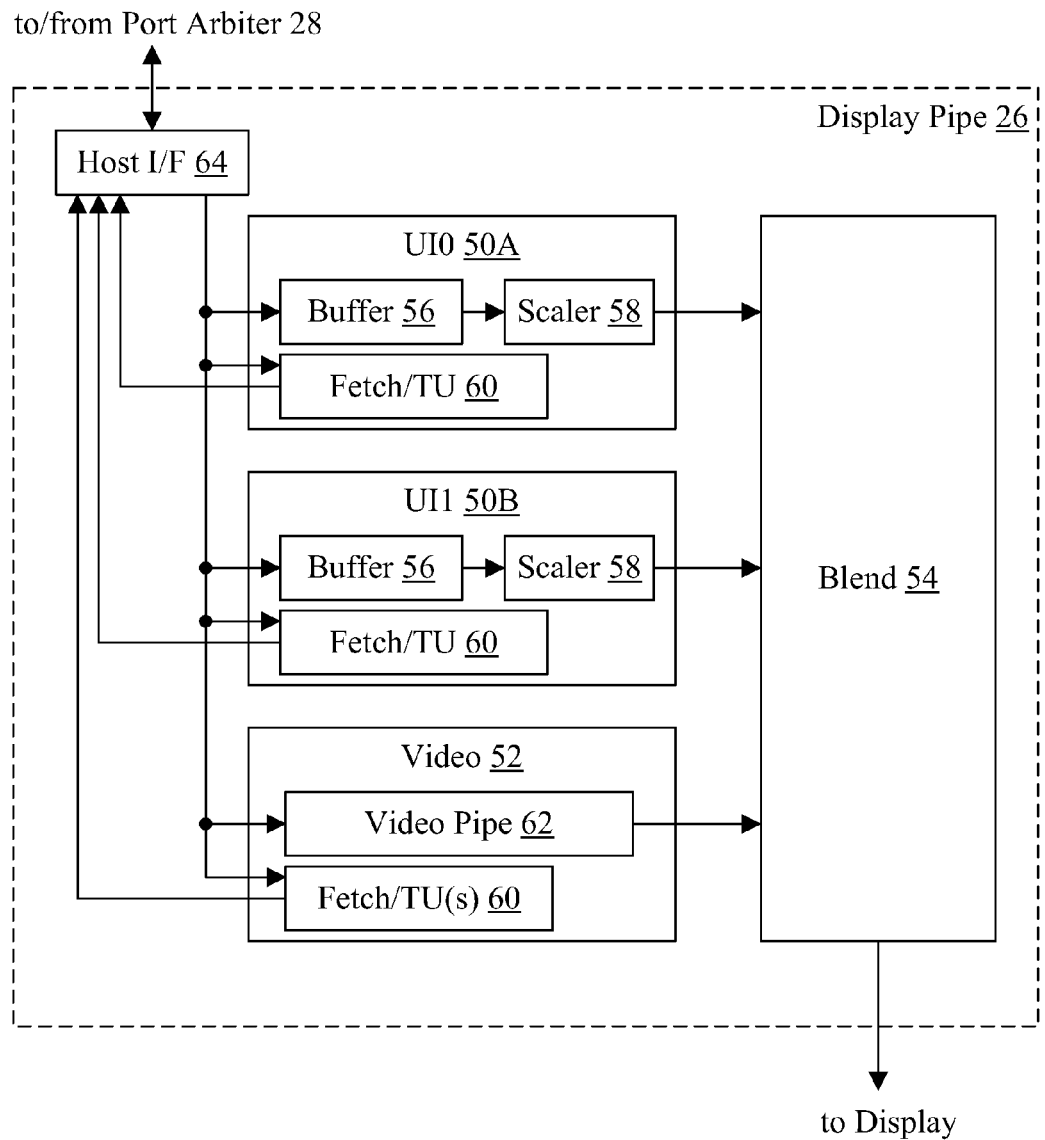
FIG. 2 is a block diagram of one embodiment of a display pipe shown in FIG. 1.

Turning now to FIG. 2, a block diagram of one embodiment of a display pipe 26 is shown. There may be multiple instances of the display pipe 26 for coupling to multiple displays (which may be controlled by display controllers, not shown, or may be directly controlled by the corresponding display pipe 26). As shown in FIG. 2, the display pipe 26 may include one or more user interface (UI) units, two shown as UI0 50A and UI0 50B in this case. One or more video units such as video unit 52 may also be included, along with a blend unit 54. A host interface unit (host I/F) 64 may also be included. Each user interface unit 50A-50B may include instances of a buffer 56, a scaler 58, and a fetch/translation unit (fetch/TU) 60. The buffer 56 may be coupled to receive image data from the host interface unit 64 and to provide the data to the scaler 58. The scaler 58 may be configured to output pixels to the blend unit 54 with an alpha value for blending. The fetch/TU 60 may be coupled to receive translation data from the host interface unit 64 and to provide memory operations to the host interface unit 64 for transmission to the port arbiter 28 (and ultimately to the memory controller 40). The video unit 52 may include a video pipe 62 and one or more fetch/TUs 60. For example, the video unit 52 may include a fetch/TU 60 for each image plane in the video sequence. The various image planes may describe the video image. For example, the image planes may be color planes (e.g. red, green, blue or Y, Cr, Cb). The fetch/TU(s) 60 in the video unit 52 may be coupled to provide memory operations to the host interface unit 64 and to receive translation data therefrom. The video pipe 62 may be coupled to receive video image data from the host interface unit 64.

Each of the fetch/TUs 60 may be configured to fetch source image data for the corresponding image processing pipeline 50A-50B or 52. The source images may be virtually addressed, and the fetch/TUs 60 may include translation units to translate the virtual addresses to physical addresses for the memory operations to read the data. The fetch/TUs 60 may also be configured to generate memory read operations to prefetch translations from memory, in response to initialization of a source image to be displayed and in response to completion of the processing of data in one or more virtual pages of the source image. Both translation read operations and image data fetch read operations may be transmitted by the fetch/TUs 60 to the host interface unit 64, which may transmit the operations to the port arbiter 28. When the data is returned for a read operation, the host interface unit 64 may tag the data for the receiving pipelines 50A-50B or 52 and may indicate whether the data is translation data or image data. The receiving unit may then capture the data in the fetch/TU 60 or the image processing pipeline as appropriate.

Generally, the image data may describe the source image to be displayed. In an embodiment, the image data for a user interface image may include pixel data and an alpha value for blending. The pixel data may describe a color for each pixel. The pixel data may be stored in the buffer 56, and may optionally be scaled by the scaler 58. The scale factors may be programmed into the user interface unit 50A-50B, or may be provided in the image data. The scaled pixels may be provided as output pixels to the blend unit 54, along with the alpha values. In an embodiment, the user interface units 50A-50B may support programmable active regions in the source image. The active regions may define the only portions of the source image to be displayed. In an embodiment, the user interface units 50A-50B may be configured to only fetch data within the active regions. Outside of the active regions, dummy data with an alpha value of zero may be passed as the pixel data.

In one embodiments, the video pipe 62 may receive fetched video frame data/information from memory, which may be in YCbCr format, and may insert random noise (dither) into the data, optionally scale the data in one or both of vertical and horizontal directions, and convert the data to the RGB color space for blending with the other image data from the user interface units 50A-50B.

The blend unit 54 may receive frames of pixels from the user interface units 50A-50B and the video unit 52, and may be configured to blend them together layer by layer. The final resultant pixels may be queued in an output FIFO and may fetched by a display controller. The lowest level layer in the blend unit 54 may be defined as the background color. Layer 1 may blend with layer 0. The next layer, layer 2, may blend with the blended layers 0 and 1, and so on until all the layers are blended.

Figure 3:
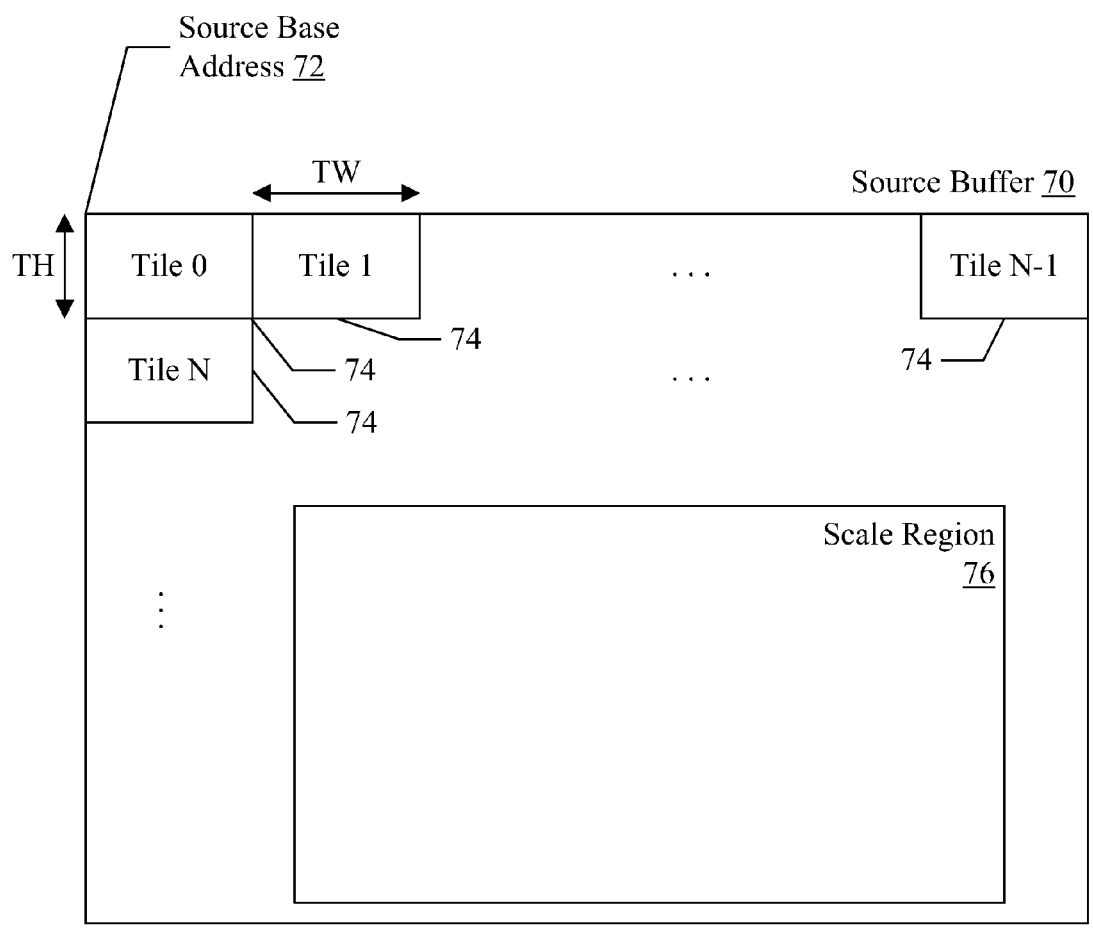
FIG. 3 is a block diagram of one embodiment of a source buffer.

FIG. 3 is a block diagram illustrating a source buffer 70 in the virtual address space for the display pipe 26. The source buffer 70 may be located in the virtual address space by the source base address 72. In the illustrated embodiment, the source buffer 70 may be arranged as a set of image tiles 74. In other embodiments, the source buffer 70 may be arranged in scan lines, or may be programmable to select between scan line and tile arrangements. In a tile arrangement, pixels within the tile are stored in consecutive virtual memory locations before moving to the next tile. The next tile may be the next adjacent tile horizontally, until the end of the width of the source buffer 70 is reached (e.g. the N−1 in FIG. 3) and the next tile is the initial tile in the next row of tiles (e.g. the N in FIG. 3). In a scan line arrangement, a row of pixels across the width of the source buffer 70 are stored in consecutive memory locations, before moving to the next row. Tile arrangements may be used, e.g. if the image may be compressed or is decompressed from a compressed image. Many compression algorithms operate by comparing tiles and storing the difference between one tile and the next, for example.

In a tile arrangement such as that shown in FIG. 3, one or more tiles may be stored in each virtual page. The size of the tile may be measured in terms of tile width (TW) and tile height (TH). In an embodiment, the tile width is measured in bytes and the tile height is measured in rows of pixels. In one example, the tile width may be 256 bytes and the tile height may be 16 rows, although larger and smaller sizes of either or both may be used in other examples. In the example, each tile is one 4 kilobyte page, and thus each tile corresponds to one translation if the virtual page size is 4 kilobytes. In other embodiments, a virtual page may include multiple tiles or a tile may extend over multiple pages.

Within the source buffer 70, a scale region 76 may be defined. The scale region 76 may be the source image to be displayed. The source buffer 70 may be the maximum sized image that is supported in the system, and images may be any size less than or equal to the maximum. The scale region is referred to as such because the source image may be scaled by the scalers in the image processing pipelines, as discussed above. The source base address 72 may be programmed into the image processing pipeline, as well as the location and size of the scale region 76.

As illustrated in FIG. 3, the number of tiles spanning the width of the source buffer 70 may be N, where N is an integer. For example, in an embodiment, the source buffer 70 may be 4 kilobytes wide and N may be 16 if the tile width is 256 bytes. Other widths may be used in other embodiments.

Figure 4:
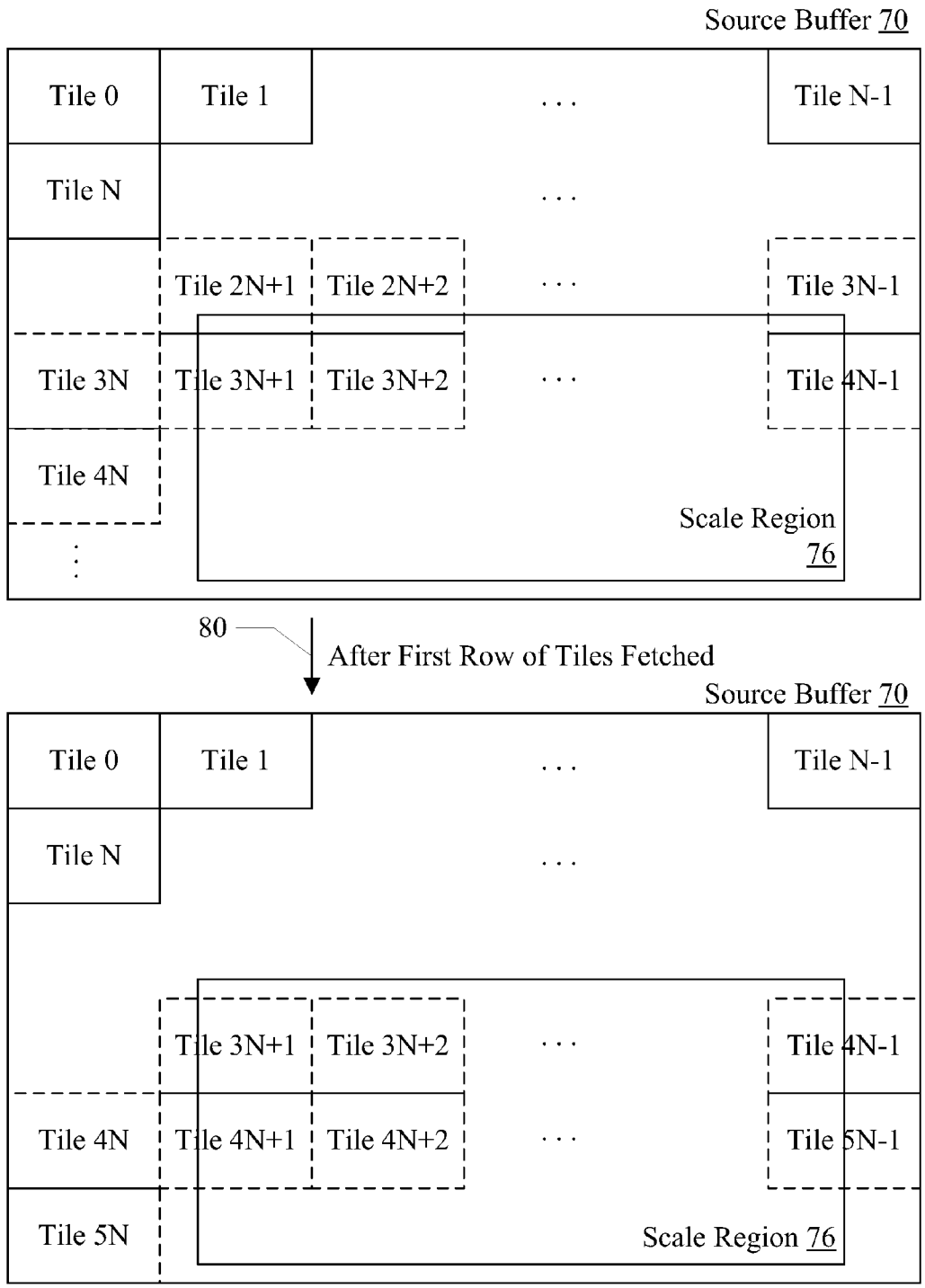
FIG. 4 is a block diagram of an example of translations that may be valid in a memory management unit (MMU) in the display pipe.

FIG. 4 illustrates the source buffer 70 and the scale region 76 when fetching of the scale region 76 is initiated. The fetch/TU 60 may prefetch the first 2N translations, beginning with the tile that includes the first pixel of the scale region 76 to be fetched. In the example of FIG. 4, the initial tile is tile 2N+1 and thus the final tile (and translation) of the first 2N tiles is tile 4N. These tiles are illustrated in dotted lines in FIG. 4 to illustrate the initially prefetched translations. FIG. 4 also illustrates the source buffer 70 and the scale region 76 at a later point in processing, after the first row of tiles has been completed (arrow 80). At this point, the fetch/TU 60 has completed fetching of the pixels within the tiles 2N+1 to 3N−1. Accordingly, these translations have been invalidated along with the translation for the tile 3N. Accordingly, new translations for tiles 4N+1 to tile 5N have been prefetched.

The fetch/TU 60 may be configured to prefetch 2N translations (where N is the number of tiles across the width of the source buffer 70) in order to permit mismatches between the fetches of the fetch/TU 60 and the tiles. For example, in an embodiment, the fetch/TU 60 may be configured to fetch 5 lines at a time from the source buffer 70. Accordingly, at any given point, the fetches might concurrently include two rows of tiles. Once the last tile of the current row has been fully fetched, the translations of that row may have been discarded and the translations for the next two rows may be available (or nearly available) via the prefetching of translations. Accordingly, in many cases, image data fetches may not experience any translation misses.

It is noted that, in the example of FIG. 4, the first tile in each row is not used. That is, the image processing pipelines may only fetch the data within the scale region 76. Accordingly, the translations for the first tile in each row may not be needed. In general, there may be one or more translations in each row that are not needed, depending on the definition of the source buffer 70 and the scale region 76. In some embodiments, the fetch/TU 60 may avoid fetching the translations for tiles that will not be used. In other embodiments, the fetch/TU 60 may simply fetch each translation (since the amount of added bandwidth to fetch the unused translations may be relatively small).

Figure 5:
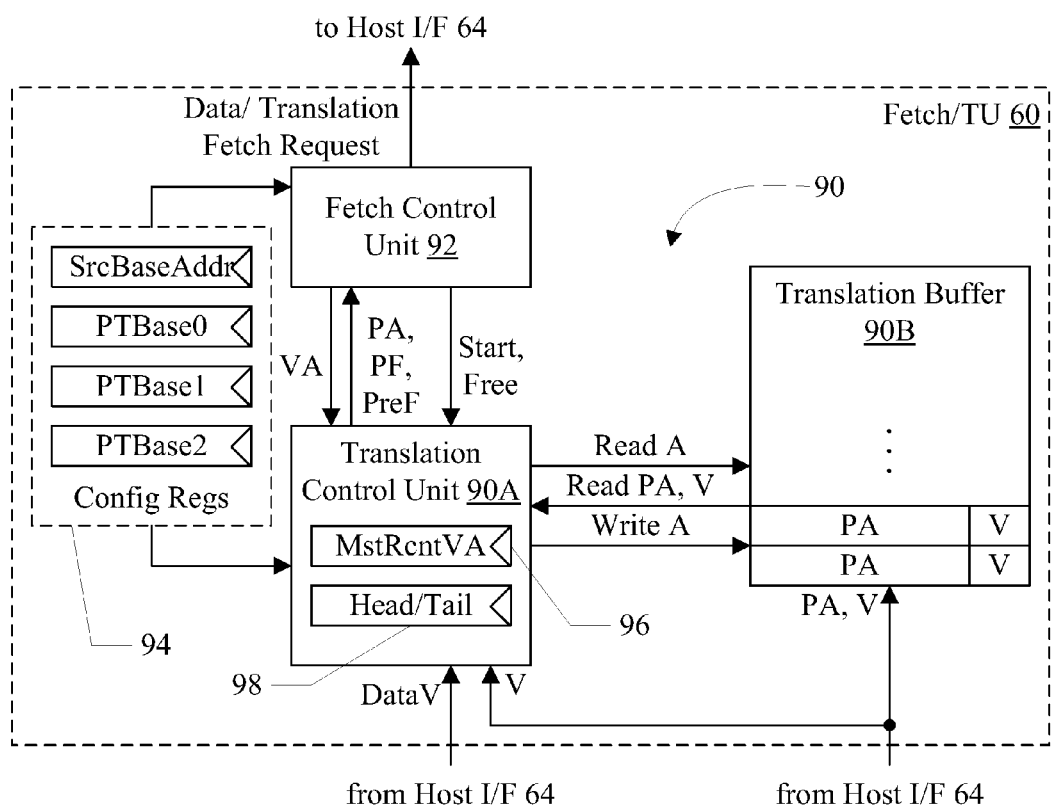
FIG. 5 is a block diagram of one embodiment of a fetch/MMU unit shown in FIG. 2.

FIG. 5 is a block diagram of one embodiment of the fetch/TU 60. In the embodiment of FIG. 5, the fetch/TU 60 includes a translation unit 90 (including a translation control unit 90A and a translation buffer memory 90B), a fetch control unit 92, and a set of configuration registers 94. The fetch control unit 92 and the translation control unit 90A may be coupled to the configuration registers 94. The fetch control unit 92 may further be coupled to the host interface unit 64 and the translation control unit 90A. The translation control unit 90A may be coupled to the translation buffer memory 90B, and both the translation control unit 90A and the translation buffer memory 90B may be coupled to receive data from the host interface unit 64.

Generally, the fetch control unit 92 may be configured to generate fetch requests for image data fetch memory operations and for translation data fetch operations (on behalf of the translation control unit 90A). In other embodiments, the fetch control unit 90A may transmit the translation data fetch requests via a separate connection to the host interface unit 64. As the fetch control unit 92 fetches the image data, the fetch control unit 92 may be configured to transmit virtual page addresses (VA in FIG. 5) to the translation control unit 90A. The translation control unit 90A may be configured to read a corresponding entry from the translation buffer memory 90B (Read A in FIG. 5), and the memory may return the physical address and valid bit (Read PA, V in FIG. 5) from the corresponding entry. The translation control unit 90A may be configured to check that the translation is valid, and may return to the fetch control unit 92 either a page fault (PF) if the translation is not valid or the physical address (PA) if the translation is valid. In other embodiments, additional translation attributes such as permission controls may also be checked and the page fault may be signaled if the translation is not valid or the attributes do not permit the access.

Additionally, when the fetch control unit 92 is initiating a fetch of a new source image, the fetch control unit 92 may be configured to transmit the initial virtual address and may signal the start of the new source image (Start in FIG. 5). In response to the start of the new source image, the translation control unit 90A may be configured to clear the translation buffer 90B and to initiate prefetches for the translations beginning with the translation for the initial virtual address. The fetch control unit 92 may further be configured to transmit a free indication (Free in FIG. 5) indicating completion of fetching of data from a given virtual page. The translation control unit 90A may be configured to invalidate corresponding translations in the translation buffer memory 90B and to prefetch additional translations consecutive to a most recently fetched virtual address. The translation control unit 90A may be configured to store the most recently virtual address for which a translation was prefetched (MstRcntVA register 96) to generate additional translation prefetches. In one embodiment, the free indication may be a signal that may be asserted to free translations one at a time, oldest first. In another embodiment, the free indication may be a count of a number of oldest translations that are free. In still other embodiments, virtual addresses of the pages being freed may be supplied.

The translation control unit 90A may be configured to manage the translation buffer memory 90B as a first-in, first-out (FIFO) buffer in one embodiment. Accordingly head and tail pointers to the memory 90B may be maintained (e.g. in register 98). The translation control unit 90A may be configured to generate prefetches to fill the memory 90B (Pref in FIG. 5). When the prefetch data is returned by the host interface unit 64, the translation control unit 90A may be configured to generate a write address (Write A in FIG. 5) to update the translation buffer memory 90B.

The translation buffer memory 90B may generally comprise any type of memory (e.g. random access memory, a set of registers or flops, etc.) arranged into a set of entries. Each entry may store a translation (e.g. PA and valid bit in the illustrated embodiment, possibly other attributes in other embodiments). Accordingly, the translation buffer 90B may include 2N entries in an embodiment. In some embodiments, the virtual page number of the translation may also be saved in the entry, and the virtual address from the fetch control unit 92 may be cammed against the memory 90B to detect a hit (or the entry that is expected to hit may be read and the virtual address may be compared to the virtual page number from the entry).

The configuration registers 94 may store various programmable values in the fetch/TU 60. For example, the source base address 72 (a virtual address) may be stored in the registers 94. One or more page table base addresses (physical addresses) may be stored in the register 94 as well. Each page table base address may locate a page table in the memory. For example, in the embodiment of FIG. 5, three page table base addresses are supported: page table base zero (PTBase0), PTBase1, and PTBase2. The number of page tables supported by the fetch/TU 60 may based on the largest supported size of the source buffer 70. Each page table may be one page in size, for example, and may store a specified number of translations. Thus, the number of pages that may be covered by the largest possible source buffer 70 divided by the number of translations that may be stored in one page table may indicate the number of page tables supported by the fetch/TU 60. Other embodiments may support less than the maximum number of page table base addresses, and the registers 94 may be updated as the source image is processed.

The translation control unit 90A may be coupled to receive the valid bit of translation data being supplied by the host interface 64, along with the indication that translation data is being provided (Data V). The translation control unit 90A may detect that the translation is being provided and may update the translation memory 90B in response.

Figure 6:
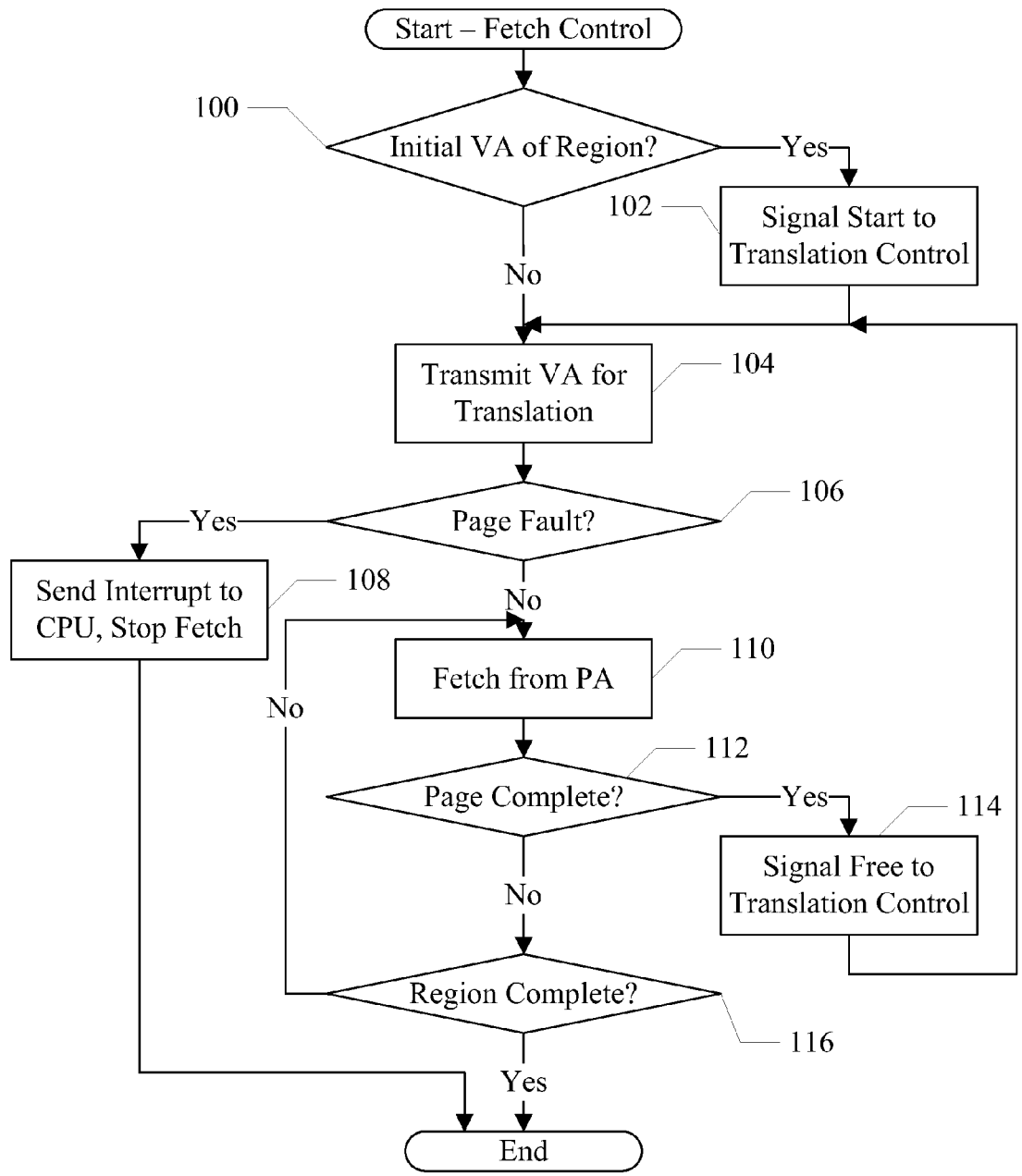
FIG. 6 is a flowchart illustrating operation of one embodiment of the fetch control unit shown in FIG. 5.

FIG. 6 is a flowchart illustrating certain operation of one embodiment of the fetch control unit 92. While the blocks are shown in a particular order for ease of understanding in FIG. 6, other orders may be used. Blocks may be performed in parallel in combinatorial logic in the fetch control unit 92. Blocks, combinations of blocks, and/or the flowchart as a whole may be pipelined over multiple clock cycles. The fetch control unit 92 may be configured to implement the operation shown in FIG. 6.

If the fetch control unit 92 is preparing to fetch the initial virtual address within a scale region 76 (e.g. the first pixel or tile of the source image—decision block 100, "yes" leg), the fetch control unit 92 may be configured to signal start to the translation control unit 90A (block 102). The fetch control unit 92 may be configured to transmit the initial virtual address to the translation control unit 90A for translation (block 104). In the case that the virtual address is not the initial virtual address, start may not be signaled but the virtual address may still be transmitted for translation (decision block 100, "no" leg and block 104).

If the translation results in a page fault (signalled to the fetch control unit 92 by the translation control unit 90A in response to the virtual address—decision block 106, "yes" leg), the fetch control unit 92 may be configured to send an interrupt to one of the processors 16 (block 108) and may stop fetching data. The fetch control unit 92 may include a register to store the virtual address that was not successfully translated. Alternatively, the translation control unit 90A may include the register, or may be configured to overwrite the most recent VA in the register 96 with the faulting virtual address.

If the translation does not result in a page fault (decision block 106, "no" leg), the fetch control unit 92 may receive the physical address (PA) from the translation control unit 90A and may be configured to transmit a fetch request using the PA (block 110). In some embodiments, the fetch control unit 92 may be configured to retain the PA from a translation and may generate fetches within the physical page until the fetch control unit 92 reaches the end of the page. In other embodiments, the fetch control unit 92 may read the translation again each time for a fetch within the physical page.

The fetch control unit 92 may be configured to detection when the fetches have reached the end of the physical page (decision block 112, "yes" leg), and may signal free to the translation control unit 90A so that the translation control unit 90A may invalidate the corresponding translation and prefetch a new translation (block 114). In another embodiment, the fetch control unit 92 may accumulate multiple free pages before signaling free for the multiple pages. In still another embodiment, the translation control unit 90A may accumulate multiple frees prior to issuing another translation prefetch request. The fetch control unit 92 may also be configured issue another VA for translation and fetch generation (block 104).

If the fetching of the scale region 76 is not complete (decision block 116, "no" leg), the fetch control unit 92 may be configured to generate additional fetches from the PA (block 110).

Figure 7:
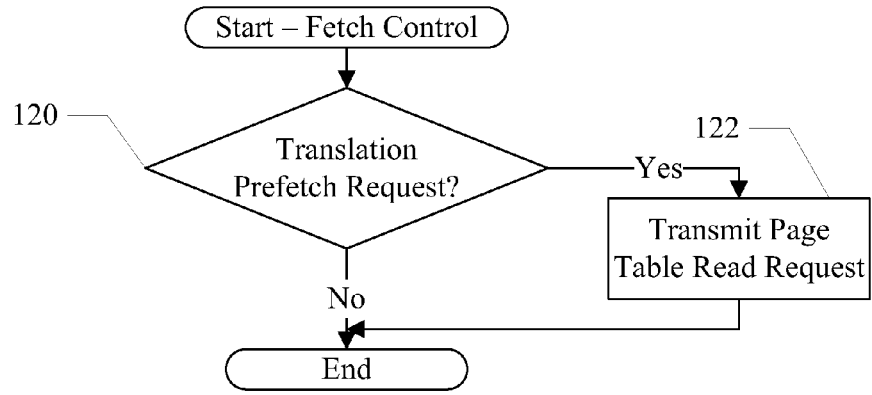
FIG. 7 is a flowchart illustrating additional operation of one embodiment of the fetch control unit shown in FIG. 5.

FIG. 7 is a flowchart illustrating certain additional operation of one embodiment of the fetch control unit 92. While the blocks are shown in a particular order for ease of understanding in FIG. 7, other orders may be used. Blocks may be performed in parallel in combinatorial logic in the fetch control unit 92. Blocks, combinations of blocks, and/or the flowchart as a whole may be pipelined over multiple clock cycles. The fetch control unit 92 may be configured to implement the operation shown in FIG. 7. In response to receiving a translation prefetch request (decision block 120, "yes" leg), the fetch control unit 92 may be configured to transmit a page table read request to read one or more page table entries (block 122). The page table entries may include the page table entry corresponding to the next consecutive virtual page to the most recent virtual address that has been prefetched by the translation control unit 90A. Additional page table entries may be read as well. In one embodiment, consecutive virtual addresses may address consecutive page table entries in the page tables. Accordingly, prefetching multiple page table entries at one time may prefetch multiple translations that may be needed by the translation unit 90 in the near future.

Figure 8:
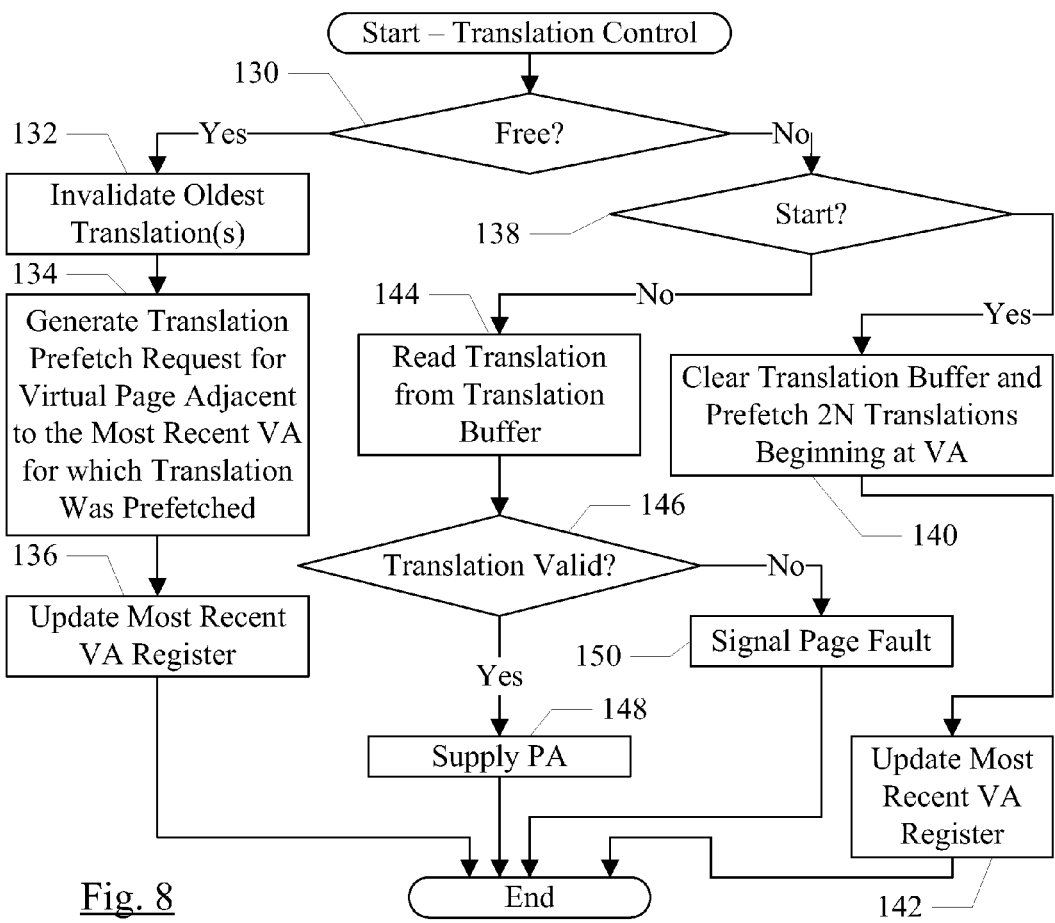
FIG. 8 is a flowchart illustrating operation of one embodiment of the translation control unit shown in FIG. 5.

Turning next to FIG. 8, a flowchart is shown illustrating certain operation of one embodiment of the translation control unit 90A. While the blocks are shown in a particular order for ease of understanding in FIG. 8, other orders may be used. Blocks may be performed in parallel in combinatorial logic in the translation control unit 90A. Blocks, combinations of blocks, and/or the flowchart as a whole may be pipelined over multiple clock cycles. The translation control unit 90A may be configured to implement the operation shown in FIG. 8.

If the translation control unit 90A receives a free indication from the fetch control unit 92 (decision block 130, "yes" leg), the translation control unit 90A may be configured to invalidate one or more translations in the translation buffer 90B (block 132). For example, in an embodiment, the translation control unit 90A may be configured to manage the translation buffer 90B as a FIFO. In such an embodiment, the oldest translations in the buffer may be at the tail pointer of the FIFO. The translation control unit 90A may be configured to generate a translation prefetch request for the virtual page that is adjacent to (or consecutive to) the most recently virtual page for which a translation was prefetched (block 134). As discussed above, the most recent virtual address may be in the register 96. One or more prefetches may be generated, depending on how many pages are free. In general, the translation control unit 90A may be configured to prefetch enough translations to fill the translation buffer 90B. The translation control unit 90A may also be configured to update the most recent virtual address in the register 96 (block 136). In an embodiment, the translation control unit 90A may be configured to delay issuing translation prefetch requests until multiple translation prefetches are ready to be issued.

In response to receiving a start indication from the fetch control unit 92 with a virtual address (decision block 138, "yes" leg), the translation control unit 90A may be configured to clear the translation buffer 90B and to prefetch 2N translations beginning at the virtual address (where N is the number of tiles in a row or the number of pixel blocks in a row) (block 140). The translation control unit 90A may also be configured to update the most recent VA register 96 with the VA corresponding to the last of the 2N translations (block 142).

Otherwise, in response to a translation request for which the start indication is not provided (decision block 138, "no" leg), the translation control unit 90A may be configured to read the corresponding translation for the VA from the translation buffer (block 144). If the translation is valid (decision block 146, "yes" leg), the translation control unit 90A may be configured to supply the PA from the corresponding translation to the fetch control unit 92 (block 148). If the translation is not valid (decision block 146, "no" leg), the translation control unit 90A may be configured to signal a page fault to the fetch control unit 92 (block 150)

It is noted that, in some embodiments, the translations used by the translation unit 90 may include one or more protection/control attributes in addition to the valid bit. For example, such attributes may include read permissions and write permissions. If read permission is not provided, the translation may not be permitted to be read. Permissions may be based on privilege level. Any set of attributes may be provided and checked. If the checks pass, the PA may be supplied. If the checks fail, a page fault may be signalled.

Figure 9:
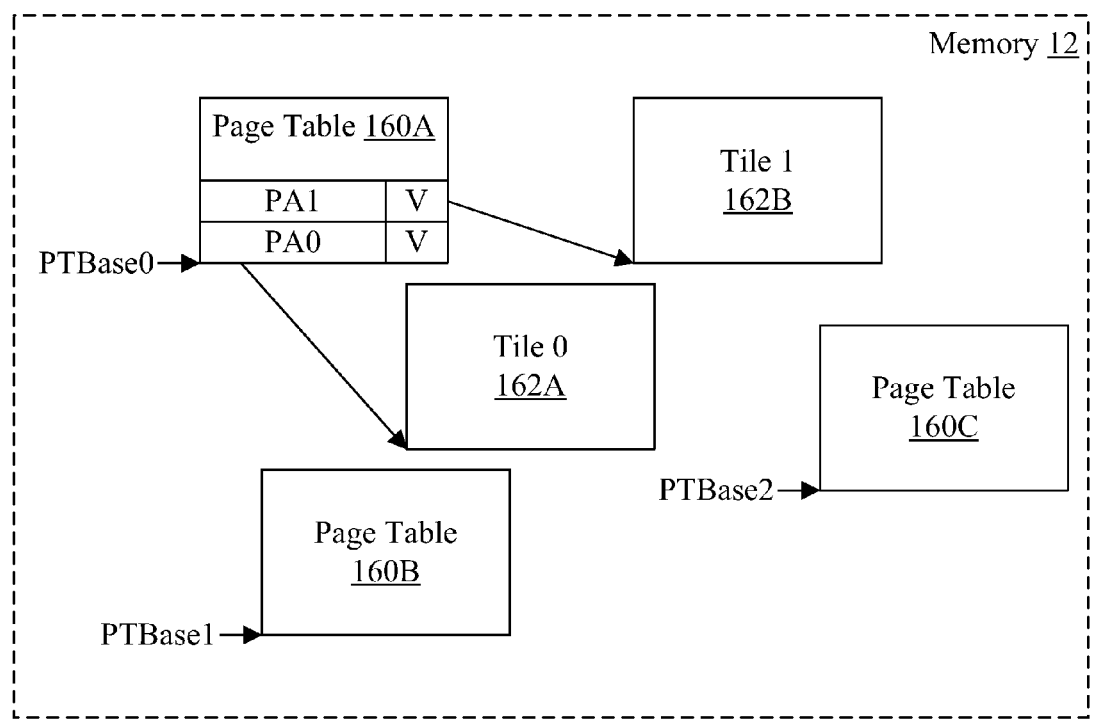
FIG. 9 is a block diagram of one embodiment of a memory storing translation tables and tiles of a source buffer.

Turning next to FIG. 9, a block diagram of one embodiment of the memory 12 (which may span the memories 12A-12B in the embodiment of FIG. 1) is shown. The memory 12 may store various page tables 160A-160C, each of which may be located by a respective page table base address (PTBase0, PTBase1, and PTBase2 in FIG. 9). Each page table 160A-160B may include a set of translation entries, each of which may locate a tile in memory 12 in this embodiment. Thus, the physical address PA0 may locate tile 0 162A, PA2 may locate tile 1 162B, etc. Consecutive VAs of pages in the source buffer 70 (e.g. tiles in this embodiment) may be translated by consecutive translations in a given page table 160A-160C. When the last translation in a page table 160A-160B is fetched, the next consecutive translation may be the first translation in the next page table 160B-160C, respectively.

Figure 10:
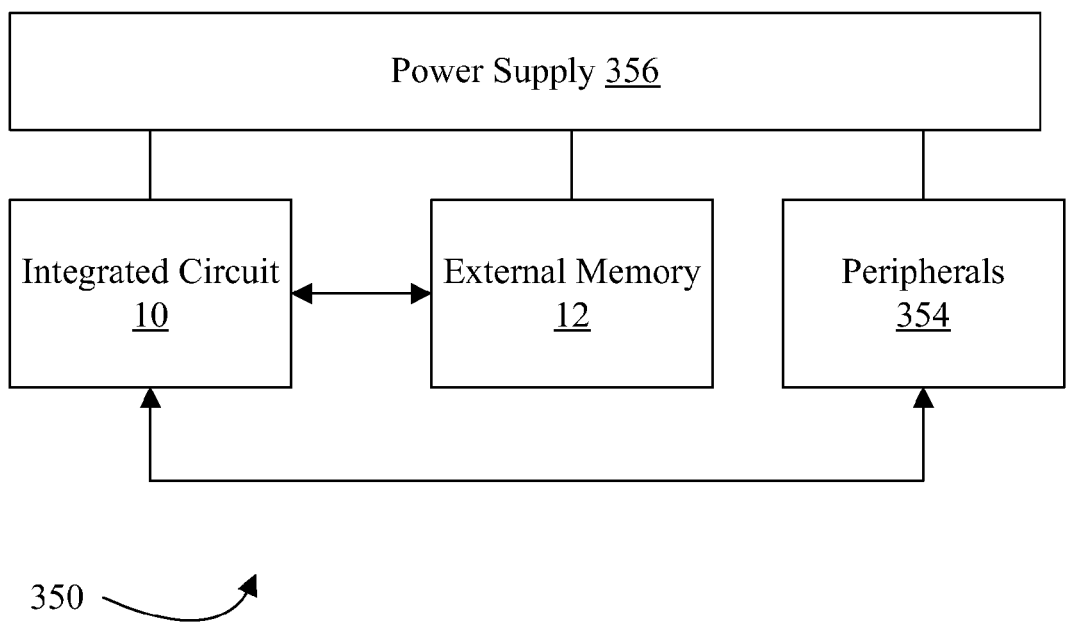
FIG. 10 is a block diagram of one embodiment of a system.

Turning next to FIG. 10, a block diagram of one embodiment of a system 350 is shown. In the illustrated embodiment, the system 350 includes at least one instance of the integrated circuit 10 coupled to external memory 12 (e.g. the memory 12A-12B in FIG. 1). The integrated circuit 10 is coupled to one or more peripherals 354 and the external memory 12. A power supply 356 is also provided which supplies the supply voltages to the integrated circuit 10 as well as one or more supply voltages to the memory 12 and/or the peripherals 354. In some embodiments, more than one instance of the integrated circuit 10 may be included (and more than one external memory 12 may be included as well).

The peripherals 354 may include any desired circuitry, depending on the type of system 350. For example, in one embodiment, the system 350 may be a mobile device (e.g. personal digital assistant (PDA), smart phone, etc.) and the peripherals 354 may include devices for various types of wireless communication, such as wifi, Bluetooth, cellular, global positioning system, etc. The peripherals 354 may also include additional storage, including RAM storage, solid state storage, or disk storage. The peripherals 354 may include user interface devices such as a display screen, including touch display screens or multitouch display screens, keyboard or other input devices, microphones, speakers, etc. In other embodiments, the system 350 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:

1. A translation unit comprising:
    a memory comprising a plurality of entries, each entry configured to store a translation for a different virtual page corresponding to a source buffer; and
    a control circuit coupled to the memory, wherein the control circuit is configured to maintain the memory as a first-in, first-out buffer (FIFO) of translations, and wherein the control circuit is coupled to receive an indication that data fetching is complete from one or more virtual pages corresponding to the source buffer, and wherein the control circuit is configured to discard a corresponding one or more oldest translations from the memory responsive to the indication and to prefetch additional translations for other virtual pages corresponding to the source buffer responsive to the indication, wherein the other virtual pages include a first virtual page that is adjacent to a second virtual page, and wherein a translation for the second virtual page is a most recently fetched translation of the translations stored in the memory, and wherein the second virtual page is different from the one or more virtual pages.

2. The translation unit as recited in claim 1 wherein the control circuit is coupled to receive a start indication indicating that processing of image data from the source buffer is beginning, wherein the control circuit is configured to clear the memory of translations in response to the start indication.

3. The translation unit as recited in claim 2 wherein the control circuit is configured to prefetch translations for a number of consecutive virtual pages corresponding to the source buffer, wherein the number is equal to a number of the plurality of entries in the memory.

4. The translation unit as recited in claim 3 wherein the number is double a number of virtual pages corresponding to a row of the source buffer.

5. A method comprising:
    prefetching a plurality of translations into a display pipe that is configured to process image data for display, wherein the plurality of translations are for virtual pages corresponding to a source buffer that includes the image data;
    receiving an indication that data fetching is complete with respect to one or more virtual pages corresponding to one or more of the plurality of translations that are oldest among the plurality of translations; and
    prefetching one or more additional translations responsive to the indication, wherein a first translation of the additional translations is adjacent to a most recently fetched translation of the plurality of translations in a page table in memory, and wherein the most recently fetched translation is different from the one or more of the plurality of translations.

6. The method as recited in claim 5 wherein the one or more additional translations are at least two translations, and wherein the at least two translations are consecutive in the page table in memory.

7. The method as recited in claim 6 wherein the plurality of translations are consecutive in the page table in memory.

8. The method as recited in claim 5 wherein a number of the plurality of translations is at least sufficient to prefetch two rows of virtual pages corresponding to the source buffer.

9. The method as recited in claim 5 further comprising:
    receiving a start indication indicating that the display pipe is starting processing of the source buffer; and
    clearing translations from a translation unit in the display pipe and prefetching the plurality of translations responsive to the start indication.

10. An integrated circuit comprising:
    a memory controller configured to couple to a memory;
    a port arbiter coupled to the memory controller;
    a first translation unit coupled to the port arbiter;
    an image processor coupled to the first translation unit, wherein the first translation unit is configured to translate addresses for virtual pages accessed by the image processor; and
    a display pipe coupled to the port arbiter, the display pipe including a plurality of image processing pipelines, and each of the plurality of image processing pipelines including at least one second translation unit configured to prefetch translations for virtual pages corresponding to a source buffer being processed by the image processing pipeline, wherein the at least one second translation unit is configured to prefetch twice a number of virtual pages corresponding to a row within the source buffer, and wherein the at least one second translation unit is configured to invalidate one or more translations responsive to the image processing pipelines completing data fetching from the corresponding virtual pages, and wherein the at least one second translation unit is configured to prefetch additional translations consecutive to the plurality of translations in response to the invalidation, wherein a first translation of the additional translations is for a first virtual page that is adjacent to a most recently prefetched virtual page in the at least one second translation unit.

11. A display pipe comprising:

circuitry configured to process image data for display, wherein the image data is stored in a source buffer in memory, and wherein the source buffer is addressed as a plurality of consecutive virtual pages; and a translation unit coupled to the circuitry, the translation unit configured to store a plurality of translations corresponding to a subset of the plurality of consecutive virtual pages, wherein the display pipe is configured to prefetch the plurality of translations, and wherein the translation unit is coupled to receive an indication from the circuitry, the indication indicating that data fetching is complete from one or more virtual pages corresponding to the source buffer, and wherein the translation unit is configured to discard the translations for the one or more virtual pages responsive to the indication, wherein the discarded translations are the oldest translations within the buffer, and wherein the translation unit is configured to prefetch additional translations for other virtual pages corresponding to the source buffer responsive to the indication, wherein the other virtual pages include a first virtual page that is adjacent to a second virtual page, and wherein the second virtual page is different from the one or more virtual pages, and wherein a translation for the second virtual page is a most recently fetched translation of the translations stored in the memory.

12. The display pipe as recited in claim 11 wherein the translation unit is coupled to receive a start indication from the circuitry, the start indication indicating that processing of image data from the source buffer is beginning, wherein the translation unit is configured to clear all translations in response to the start indication.

13. The display pipe as recited in claim 12 wherein the translation unit is configured to prefetch translations for a number of consecutive virtual pages corresponding to the source buffer, wherein the number is equal to a number the plurality of translations.

14. The display pipe as recited in claim 13 wherein the number is double a number of virtual pages corresponding to a row of the source buffer.

* * * * *